United States Patent [19]

Imperiali

[11] Patent Number: 5,210,526
[45] Date of Patent: May 11, 1993

[54] AUTOMATIC LEAK DETECTION APPARATUS FOR PROCESS FLUIDS FROM PRODUCTION AND/OR RESEARCH PLANTS, IN PARTICULAR ENERGY PLANTS

[75] Inventor: Franco Imperiali, Rome, Italy

[73] Assignee: Ente per le Nuove Technologie, l'Energia e l'Ambiente (ENEA), Rome, Italy

[21] Appl. No.: 596,078

[22] Filed: Oct. 11, 1990

[30] Foreign Application Priority Data

Oct. 13, 1989 [IT] Italy ................................ 48455 A/89

[51] Int. Cl.$^5$ ............................................ G08B 21/00
[52] U.S. Cl. .................................. 340/605; 340/603; 73/40.5 R; 358/100; 376/250
[58] Field of Search ............... 340/605, 603; 73/40, 73/40.5 R; 358/100; 376/250, 251, 252, 253

[56] References Cited

U.S. PATENT DOCUMENTS

| | | | |
|---|---|---|---|
| 3,987,662 | 10/1976 | Hara et al. .................. | 73/40.5 R |
| 4,582,671 | 4/1986 | Rindo ........................ | 376/251 |
| 4,656,509 | 4/1987 | Matsuyama et al. ......... | 358/100 |
| 4,857,261 | 8/1989 | Marshall et al. ............. | 376/250 X |

OTHER PUBLICATIONS

Patent Abstracts of Japan vol. 11, No. 373 (P-643) [2820] Dec. 5, 1987, M. Ikeda, (JP-A-62-144038).
Patent Abstracts of Japan, vol. 13, No. 80 (P-832) [3428] Feb. 23, 1989, K. Hayashi, (JP-A-63-263421).
Patent Abstracts of Japan vol. 13, No. 209 (P-871) [3557] May 17, 1989, M. Ikeda, (JP-A-1-26122).

Primary Examiner—Jin F. Ng
Assistant Examiner—Jeffery A. Hofsass
Attorney, Agent, or Firm—Stevens, Davis, Miller & Mosher

[57] ABSTRACT

An automatic leak detection apparatus for process fluids from production and/or research plants, in particular energy plants comprises three different and separate sets of sensors, the first of which analyzes signals sensed in the visual spectrum through a telecamera, the second set analyzes signals sensed in the infrared spectrum through a thermocamera, and the third set analyzes qualitatively and quantitatively any change in the composition of the environmental atmosphere through a chemical-excitation mass spectrometer, and means adapted to process data supplied by said three sets of sensors, to compare said data with reference data, to store said data, to generate alarm signals at different levels, and to give assistance, if necessary.

19 Claims, 3 Drawing Sheets

AUTOMATIC LEAK DETECTION APPARATUS FOR PROCESS FLUIDS FROM PRODUCTION AND/OR RESEARCH PLANTS, IN PARTICULAR ENERGY PLANTS

The present invention relates to an apparatus for automatically monitoring and detecting leaks of fluids from lines or container under pressure and temperature effects, said apparatus being also adapted to detect in real or almost real time such leaks with a high reliability.

More particularly the invention concerns the monitoring of the leakages of the cooling fluid for the primary circuit of the nuclear plants formed of pressurized-water reactor (PWR) and boiling-water reactors (BWR) for the production of electric energy.

At the present status of art reliable methods of detecting at the very beginning leaks of process fluids from the primary circuits of pressurized and boiling reactors are not known.

In the nuclear plants there are some important specifications with which the leak detection system should comply.

The leak detection methods used at the present are:
monitoring the bilge flow;
monitoring the room radioactivity of the content;
balancing the mass of the cooling agent;
measuring the moisture by means of strips;
monitoring the acoustic emission.

None of the above mentioned methods is adapted to allow the leakage to be monitored, detected and evaluated.

The most reliable method used at the present time to detect leakages is monitoring the bilge flow. Monitoring the environmental radioactivity of the content is considered reliable but considerably limitative in controlling BWR which originates a number of undesired alarms.

This invention seeks to provide a high-reliability system such as to allow: detecting the extent of the leakage in real or nearly real time; monitoring the nuclear plant and the most involved areas thereof; maintaining the several parts of the production system without interrupting the monitoring action; eliminating the undesired alarms; and avoiding the masking phenomenon which makes the control system blind.

According to the invention there is provided an apparatus consisting of one or more telecameras, one or more thermocameras and a chemical-excitation mass spectrometer which are connected to one or more computers suitably programmed to process signals, to supply alarm signals of different type and to collect information about the events.

The apparatus is based upon the control of the variations of some physical parameters which are typical of the plant and/or the checked components, and the functional characteristics which are typical of the fluids when released from the so called holding barriers such as pipes, valves, reservoirs, a.s.o. Such control is executed through three lines provided with different and independent sensors adapted to detect completely different, physical phenomena.

The three lines analyze signals typical of the leakage of fluids to the environment as follows:

I—Signals sensed in the visual spectrum through telecameras:
aspect of the fluid released in the vapour phase or in the liquid phase;
aspect of the variations caused in the components or in the environment such as alteration of the surfaces due to deposit, impregnation or chemical reaction.

II—Signals sensed in the infrared spectrum through thermocamera:
direct infrared emission of the fluid in vapour or liquid phase due to the specific characteristics of emissivity thereof or to the difference between the temperature of the fluid and that of the environment;
emission due to the variations caused in the components or in the monitored environment such as alteration of the surfaces due to deposit, impregnation or chemical reaction.

III—Variation of the environmental composition by qualitative and quantitative analysis through a chemical-excitation mass spectrometer:
variation of the composition due to the presence of fluid vapours;
variation of the composition of the atmospheric fluid due to products of any chemical reactions between atmosphere and fluid and/or between fluid and surrounding materials (in case of nuclear plants, the presence of hydrogen produced by local accident).

Coupling all of the three lines of sensors or one of the first two lines with the third line makes the system highly reliable. There is provided a central computer which processes the signals and allow an automatic control to be effected at very short signal times.

The first two lines of sensors are adapted to detect, to locate and to evaluate approximately the leaks of fluids, and the third line of sensors is adapted to locate and to estimate the amount of the leaked fluids and to determine its origin. In any case, by analyzing completely different parameters, events such as to mask the real signal in all of the three lines of sensors or to simulate false material-leak signals are very difficult to take place.

The invention will be now described with reference to the annexed drawing showing by way of an illustrative, not limitative example a preferred embodiment of the invention.

Figure 1:
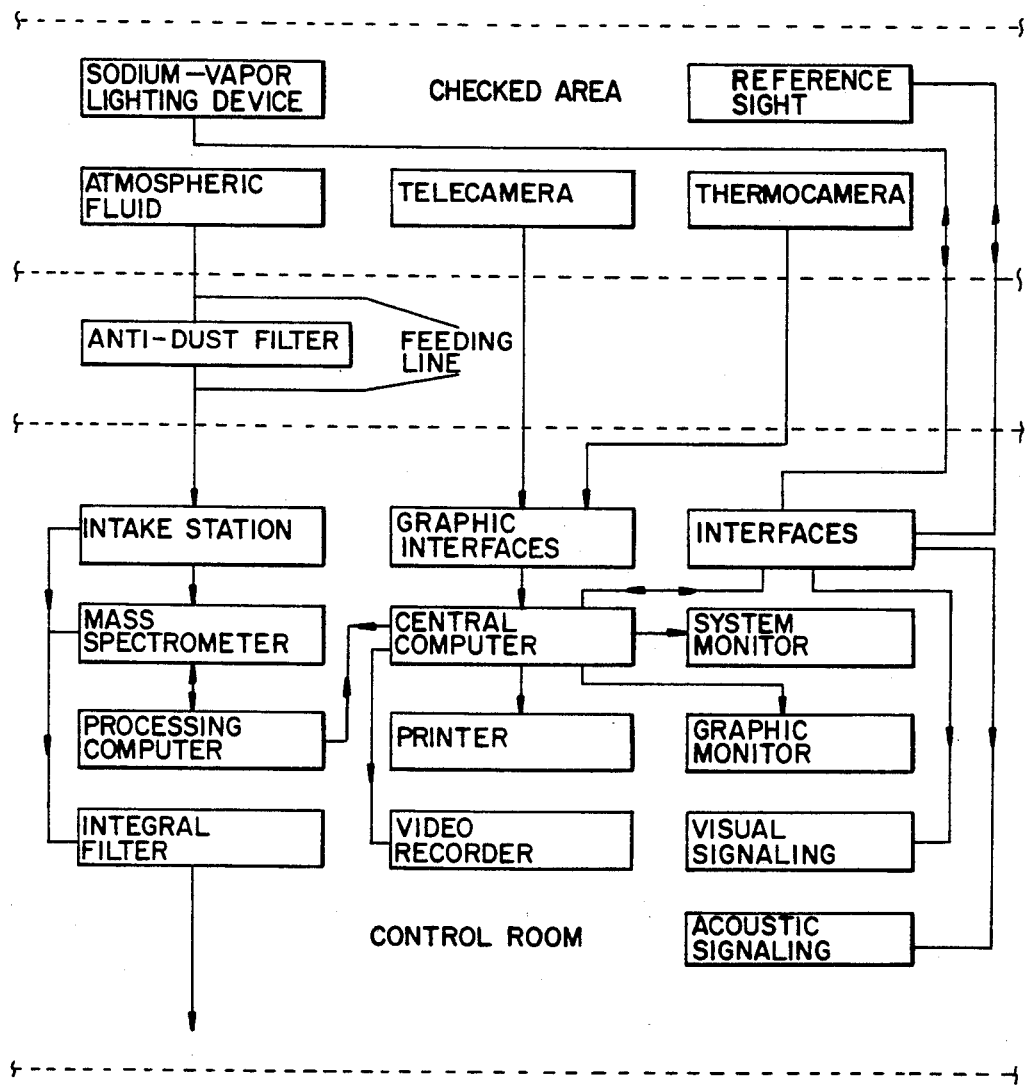
FIG. 1 shows the block diagram of the apparatus according to the invention in its basic configuration.

With reference to FIG. 1, the control apparatus according to the invention is shown in its basic configuration but can also have a more complex configuration, namely:

telecamera and thermocamera can be mounted on an automatic training system controlled by a central computer so as to allow several actions to be shot;

several thermocameras and/or telecameras can be used;

the intake unit can be provided with several intake port cyclically connected to the mass spectrometer;

each line can be provided with own computer to be connected to a central computer analyzing the information and supplying the alarm signals;

in case of several computers the analysis can be carried out also simultaneously by the several lines.

Figure 2:
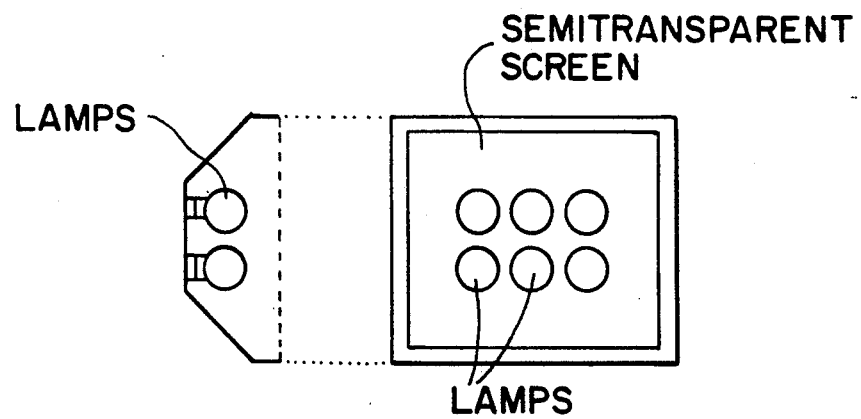
FIG. 2 shows the detail of the reference sight associated to the telecamera and the thermocamera, in front and sectional view.
Figure 3:
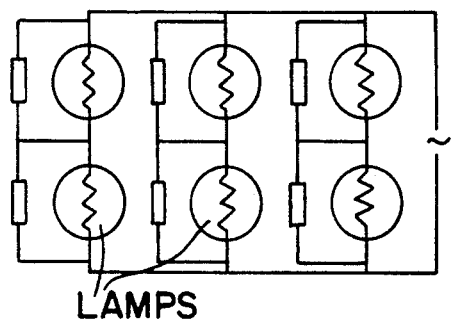
FIG. 3 shows in enlarged scale the supplying circuit diagram of the lamps of FIG. 2.

In the checked area ZC there are placed:

telecamera TC which is adapted to detect the fumes produced by the condensation of the emitted fluid vapours and/or any liquid emission and/or any change in the surface of the components or in the environment due to the condensation or to the reactivity of the fluid;

thermocamera TM which is adapted to detect the thermal image of the emitted fluid vapours and/or any liquid emission and/or any change in the surface of the components or in the environment due to the condensation or to the reactivity of the fluid vapours and the liquids, said telecamera TC and said thermocamera TM being placed in shielded containers provided with thermostats;

the reference sight TR to control the focusing and the sensitivity of the telecamera and the thermocamera (FIGS. 2 and 3);

each lamp L is connected in series to other two lamps, all of them being provided with an automatic lighting device so as to be put on any time the first lamp is put out due to the break of the filament, the lamps being supplied with about half the nominal voltage to extend their useful life;

intake mouth for the atmospheric fluid B;

sodium vapor lighting device D for the environment.

In the control room SC there is provided an intake station CA for the atmospheric fluid of the environment flowing through anti-dust filter F and feeding line CR heated to avoid a condensation along its extension and both conveying a part of the intake fluid into mass spectrometer SM and ejecting the remaining part of the fluid through an integral filter FG into the atmosphere in order to avoid storing effects in the intake line.

Chemical-excitation mass spectrometer SM analyzes the composition of the atmospheric fluid and is adapted to detect the modifications thereof. Said mass spectrometer is associated to a processing computer CG. The apparatus further comprises:

telecamera-computer and thermocamera-computer interfaces which allow the image to be digitized and supplied to the computer in digital form, said image being divided in surface portions or pixels each associated to position data and to a signal intensity in digital form from 0 to 255;

interface between computer lighting control lamp and computer reference sight control;

central computer CC analyzing the thermographic visual images, processing the signals from the three sensors and the thermographic visual signals as well as the signals of molecular composition of the atmosphere, and selecting the alarm levels to be supplied outside after evaluation of the received information;

system monitor MS of the central computer;

graphic monitor MG to which the visual images and the thermographic images are supplied;

printer ST for graphically recording the abnormal operations and events;

videorecorder VR for recording the development of the abnormal events.

The apparatus is designed such as to allow an automatic operation after initialization and selection of the control parameters. The initialization should be executed by a skilled in the art according to the specification of the apparatus to be controlled and the safety rules. Once initialized the system, it is no longer possible to change the parameters during the operation. The apparatus should be put out of operation and the initialization procedures should be repeated to change the selected parameters.

The apparatus is operated only by a skilled in the art. The computer asks the operator the starting code. The operator digitizes the code and the computer shows on a display a list of checking instructions to be executed before carrying on.

The checking instructions to be executed are shown one at a time, and after the execution of any instruction listed herebelow the operator should press "return":

switching on the lighting lamps L;

switching on the reference sight;

checking the operation of the graphic monitor MG;

switching on telecamera TC and checking the sensitivity and the correct focusing;

switching on thermocamera TM and checking the sensitivity and the correct focusing;

checking position, visibility and size of reference sight TR viewed from telecamera TC;

checking position, visibility and size of reference sight TR viewed from thermocamera TM;

checking the operation of printer ST;

checking the operation of videodisplay VR;

checking the operation of intake station CA and the alarm signal due to wrong operations;

checking the heating of feeding line CR and the alarm signal due to wrong operations.

In order to initialize and to start the computer associated to mass spectrometer SM the following operations should be carried out:

defining the composition of the atmosphere of the checked environment;

indicating the main compounds of the leaked fluid;

positioning the pre-alarm threshold;

positioning the alarm threshold;

checking the operation of the mass spectrometer.

At the end of the checking procedures proposed to and validated by the operator, the apparatus is operated.

The operator should then supply the computer with the requested data:

Data for the Telecamera sector in which the reference sight is situated;

size of reference sight TR (viewed from telecamera);

level of the signal supplied by the reference sight;

level of the white-alarm threshold (pre-alarm S1);

level of the red-alarm threshold (alarm S2);

number of images to be averaged (12 to 250 corresponding to 0.5 and 25 seconds, respectively);

control period or analysis rate To (minimum analysis time of the computer, 50 to 360 seconds or more according to the control specification of the system).

Data for the Thermocamera sector in which the reference sight is situated (the same reference sight as that of the telecamera or a different reference sight can be used);

size of the reference sight (viewed from the thermocamera);

level of the signal supplied by the reference sight;

level of the intensity threshold for adjusting the reference image Sg3 (transient check);

threshold level of the number of images for adjusting the reference image Sg4 (transient check);

level of the white-alarm threshold (pre-alarm S1);

level of the red-alarm threshold (alarm S2);

number of images to be averaged (12 to 250 corresponding to 0.5 and 25 seconds, respectively);
control period or analysis rate T1 (as above);

Data for the Mass Spectrometer type of the main fluids;
level of the white-alarm threshold (pre-alarm S1);
level of the red-alarm threshold (alarm S2);
control period or analysis rate T2 (as above);
After data has been set the apparatus is ready to operate automatically.

DESCRIPTION OF THE PROCEDURE AND THE CONTROL PROGRAM

1) Line of the Telecamera

Preliminary starting step

1—A predetermined number of images are received, digitized at about 11 MHz and divided in 512×512 or 1024×1024 pixels or other standard.

Figure 4:
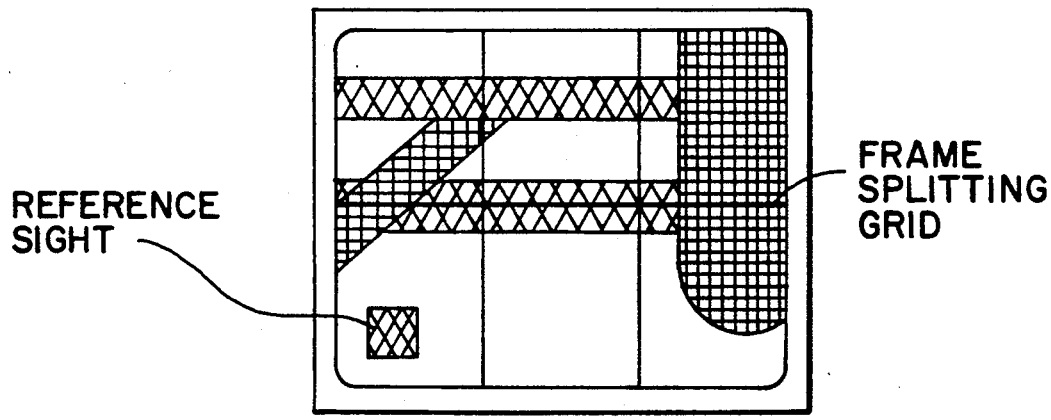
FIG. 4 shows the detail of the grid splitting the frame.

2—The arithmetical mean of the light signal intensities is effected pixel by pixel, and the resulting image "A" is divided in the predetermined number of sectors (see FIG. 4).

3—Position, size and intensity of the reference sight are checked.

If 90% of the pixels have intensity lower than 5 or greater than 250, the following writing preceded by an acoustic signal appears on the videodisplay: "abnormal operating condition—check telecamera"

If the number of pixels having intensity greater than 250 is greater than 10% the following writing preceded by acoustic signal appears on the videodisplay: "bloom—check telecamera" (outer signal of white alarm)

If at least 10% of pixels do not have intensity greater than 180, the following writing preceded by acoustic signal appears on the videodisplay: "failing brightness—check telecamera" (outer signal of white alarm)

If the size of the pixels of the reference sight is different by more than 10% over that stored, the following writing preceded by acoustic signal appears on the videodisplay: "telecamera is out of focus or out of place—check telecamera—" (outer signal of white alarm)

If the trouble remains, the following writing preceded by acoustic signal appears on the videodisplay after a predetermined time: "data from telecamera not reliable" (outer signal of white alarm)

The connection can be re-established by the operator. Positive check. Carry on. Positions 1, 2, 3 are "procedure P1".

4—The image is stored as reference image "A".

Automatic control step

5—After time 2To has elapsed a second image is received by procedure "P1".

6—The image is stored as reference image "B1".

7—The following difference is executed pixel by pixel: "A"-"Bi" (if the frame does not change the result will be zero, i.e. a completely black image).

8—The resulting image is transformed into binary code. The maximum value (255) is assigned to the pixels exceeding the predetermined threshold value, and the minimum value (0) is assigned to the pixels under said threshold value.

9—The pixels having intensity 255 are counted. The result (D1) is fed by the computer to the printer sector by sector. Image "Bi" is removed from the memory.

Items 5, 6, 7, 8 and 9 above form the procedure P2.

10—If D1 does not exceed the predetermined threshold in any sector, a further procedure P2 is started and so on.

10a—If the first threshold value (S1, white alarm) is exceeded at one or more than half predetermined sectors, a pre-alarm signal is generated. Such signal is supplied to the light alarm device and to the printer. The computer starts the videorecorder.

10b—A further procedure P2 is started.

10c—If the first threshold value (S1, white alarm) is exceeded again, the pre-alarm signal is continued.

10d—If D1 does not exceed the predetermined value, the alarm signals are interrupted, and the videorecorder is switched off.

10e—A further procedure P2 is started and so on.

10f—If the first threshold value (S1, white alarm) is exceeded at more than half predetermined sectors, or the second threshold value is exceeded in some of them (S2 red alarm), an alarm signal is generated. Such signal is supplied to the light alarm device and to the acoustic alarm device (as well as to suitable actuators according to the procedures of the plant). The computer starts the videorecorder.

10g—A further procedure P2 is started.

10h—If the first threshold value (S1, white alarm) is exceeded again at more than half predetermined sectors, or the second threshold value (S2, red alarm) is exceeded, the alarm signal is continued.

10i—A further procedure P2 is started.

10l—If D1 does not exceed the predetermined threshold, the alarm signals and the videorecorder are active in any case. Only the operator can re-establish the normal conditions. In any case a further image is received.

At the end of any cycle the computer switches over the thermocamera TM.

The stop of the image receiving apparatus can be executed only by an authorized operator and such operation is in any case signalled.

2) Line of the Thermocamera

Preliminary starting step

1—A predetermined number of images are received, digitized at about 11 MHz and divided in 512×512 or 1024×1024 pixels or other standard.

2—The arithmetical mean of the light signal intensities is effected pixel by pixel, and the resulting image "A" is divided in the predetermined number of sectors (see FIG. 4).

3—Position, size and intensity of the reference sight are checked.

If 90% of the pixels have intensity lower than 5 or greater than 250, the following writing preceded by an acoustic signal appears on the videodisplay: "abnormal operating condition—check thermocamera"

If the number of pixels having intensity greater than 250 is greater than 10% the following writing preceded by acoustic signal appears on the videodisplay: "bloom—check thermocamera" (outer signal of white alarm)

If at least 10% of pixels do not have intensity greater than 180, the following writing preceded by acoustic signal appears on the videodisplay: "failing brightness—check thermocamera" (outer signal of white alarm)

If the size of the pixels of the reference sight is different by more than 10% over that stored, the following writing preceded by acoustic signal appears on the videodisplay: "telecamera is out of focus or out of place—check telecamera—" (outer signal of white alarm)

If the trouble remains, the following writing preceded by acoustic signal appears on the videodisplay after a predetermined time: "data from thermocamera not reliable" (outer signal of white alarm)

The connection can be re-established by the operator. Positive check. Carry on.

Positions 1, 2, 3 are "procedure P1".

4—The image is stored as reference image "A".

5—After time 2To has elapsed a second image is received by procedure "P1".

6—The image is stored as reference image "B".

Automatic control step

7—The following difference is executed pixel by pixel: "A"-"B" (if the frame does not change the result will be zero, i.e. a completely black image, system in stationary operation, no trouble).

8—The resulting image is transformed into binary code. The mean intensity is calculated and the maximum value (255) is assigned to the pixels exceeding the predetermined threshold value Sg3, and the minimum value (0) is assigned to the pixels under said threshold value. Further all pixels exceeding threshold Sg4 are counted. Resulting data is reported as histogram.

(Since the system is started till it reaches the running conditions and during the transient steps monitored or not by the operator, images "A" and "B" are reference images with which the successive images "Ci" are compared).

Item 8 is procedure P3.

9—After time 3To has elapsed a third image is received by procedure "P1".

10—The image is stored as reference image "Ci". Procedure P3 ("A"-"Ci") is executed. (If there is no difference after a predetermined number of received images, image "A" is replaced with an image "Ci" and the procedure is continued as in the case of the telecamera).

11—The following difference is executed pixel by pixel: "B"-"Ci" (if the frame does not change the result will be zero, i.e. a completely black image).

12—The resulting image is transformed into binary code. The maximum value (255) is assigned to the pixels exceeding the predetermined threshold value, and the minimum value (0) is assigned to the pixels under said threshold value.

13—The pixels having intensity 255 are counted. The result (D1) is fed by the computer to the printer sector by sector.

Items 11, 12, 13 above form the procedure P2.

14—If D1 does not exceed the predetermined threshold in any sector, a further procedure P2 is started and so on.

14a—If the first threshold value (S1, white alarm) is exceeded at one or more than half predetermined sectors, a pre-alarm signal is generated. Such signal is supplied to the light alarm device and to the printer. The computer starts the videorecorder.

14b—A further procedure P2 is started.

14c—If the first threshold value (S1, white alarm) is exceeded again, the pre-alarm signal is continued.

14d—If D1 does not exceed the predetermined value, the alarm signals are interrupted, and the videorecorder is switched off.

14e—A further procedure P2 is started and so on.

14f—If the first threshold value (S1, white alarm) is exceeded at more than half predetermined sectors, or the second threshold value is exceeded in some of them (S2, red alarm), an alarm signal is generated. Such signal is supplied to the light alarm device and to the acoustic alarm device (as well as to suitable actuators according to the procedures of the plant). The computer starts the videorecorder.

14g—A further procedure P2 is started.

14h—If the first threshold value (S1, white alarm) is exceeded again at more than half predetermined sectors, or the second threshold value (S2, red alarm) is exceeded, the alarm signal is continued.

14i—A further procedure P2 is started.

14l—If D1 does not exceed the predetermined threshold, the alarm signals and the videorecorder are active in any case. Only the operator can re-establish the normal conditions. In any case a further image is received.

The stop of the image receiving apparatus can be executed only by an authorized operator and such operation is in any case signalled.

3) Line of the Mass Spectrometer

Starting step

The analysis program is initialized by supplying the computer of the mass spectrometer with:

type of compounds to be considered as indicator of the releasing area;

pre-alarm threshold regarding the predetermined products;

alarm threshold regarding the predetermined products;

time between analysis cycles (1 minute and over).

The environmental fluid is first drawn.

The fluid is analyzed.

The results are presented in graphic form and shown on the display of the computer.

The results are stored and used as reference "A".

Control step

When the control computer enables the analysis:

1—The inlet valve is opened.

2—The fluid is analyzed.

3—The result are presented in graphic form and shown on the videodisplay of the computer of mass spectrometer "B".

4—Data of reference analysis "A" is retrieved.

5—Difference "A"-"B" is executed.

6—If there are predetermined products, an alarm signal is fed to the central computer.

6'—The control computer provides a light and acoustic alarm signal.

7—If the water amount exceed the first threshold, a pre-alarm signal is supplied to the central computer.

7'—The alarm signal is fed also to the printer, and a light and acoustic signal is generated.

7"—If the prealarm signal has been already supplied also from other lines, the system generates in such case an alarm signal.

7'"—If the water amount exceed the second threshold, the central computer is supplied with an alarm signal.

7""—The alarm signal is fed also to the printer, and a light and acoustic signal is generated.

8—If the result of the difference above is not positive, a further analysis is effected in the predetermined time.

The alarm signals can be combined in different ways according to the safety requirements of the plant or the checked component.

In case of the basic configuration, the central computer enables cyclically the analysis on the different control lines in the predetermined time.

Figure 5:
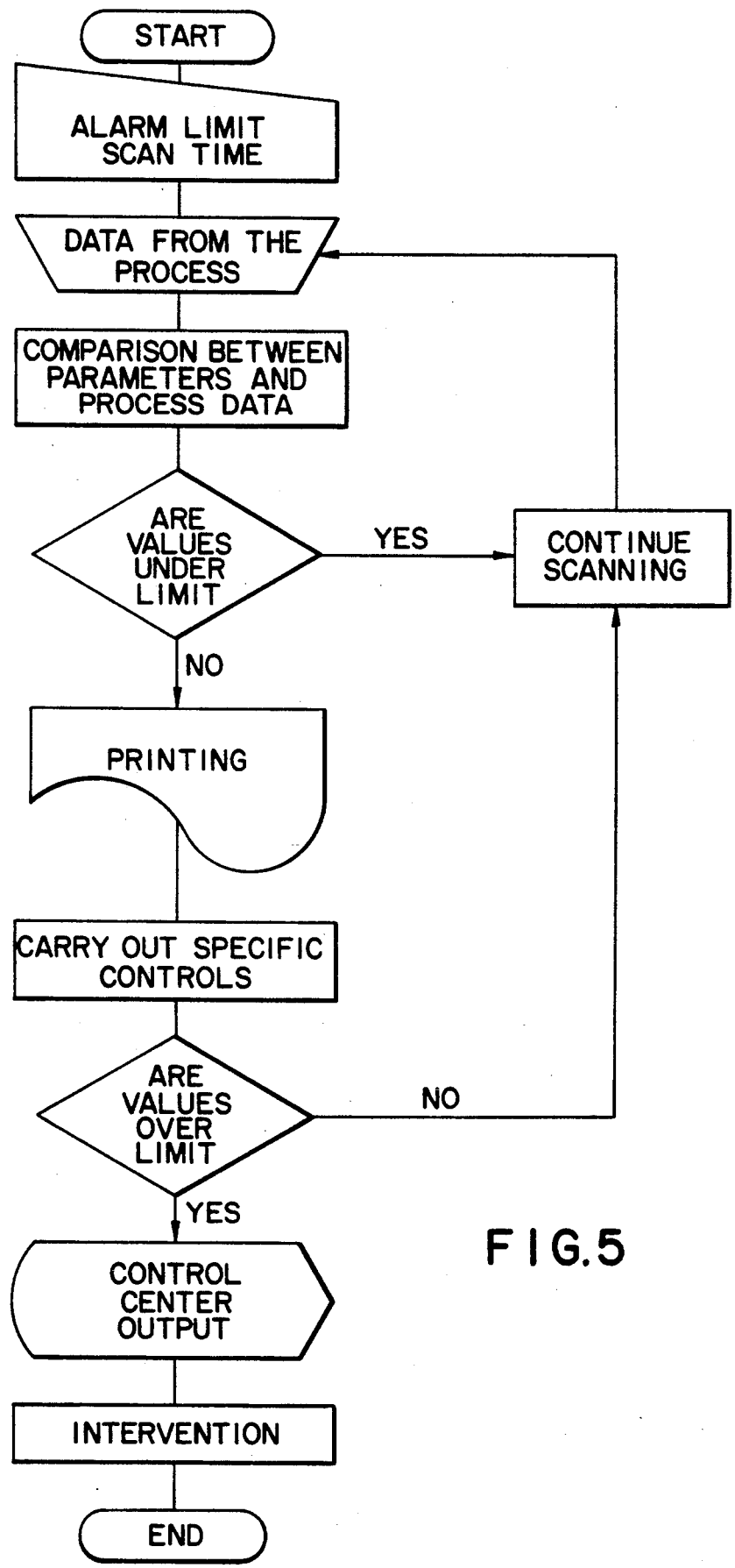
FIG. 5 shows the block diagram of an analysis and control cycle.

In FIG. 5 the block diagram of the different steps forming the operating cycle of the apparatus is shown.

From the foregoing it should be appreciated that the invention provides a reliable, complementary, decisive apparatus adapted to supply signals in real or nearly real time and to control fluid leaks, while avoiding that a not effected alarm signalling causes a disaster.

The most evident advantages of the invention are the following:

A) The possibility of an automatic leak detection through the control of three different characteristics by not interacting sensors which cannot receive at the same time masking signals and dragging actions.

B) The possibility of leak detection at the very beginning, i.e. in real or nearly real time.

C) The possibility of using reliable sensors which can be interfaced with computers as well as processing personal logic interventions adapted to the specific plants using such apparatus.

D) The high reliability provided by the control of three physical different parameters with three independent lines of sensors, and the possibility of locating several apparatus on line to carry out several signal logics.

E) The possibility of using commercial sensors with high reliability and to interface them in different ways to one or more computers.

F) The very low possibility of causing such effects as to simulate on all of the three lines of sensors not existing leak signals, or causing leak signals which are not detected by any of the three lines of sensors.

The present invention has been illustrated and described with reference to a preferred embodiment but it should be understood that construction modifications can be made without parting from the scope of this industrial invention.

I claim:

1. An automatic leak detection apparatus for process fluids from an energy production plant or an energy research plant, comprising a plurality of operatively and structurally independent sensors which evaluate different and independent physical parameters, located in predetermined areas and/or in components of the plant to be monitored, data processing means associated with said sensors for processing data supplied by said sensors and for comparing sensor supplied data with reference data, signalling and storing means for generated data from said processing means, and alarm and/or control means actuatable by said generated data, said sensors being formed of a first set of sensors sensing signals in the visual spectrum through a telecamera, a second set of sensors sensing signals in the infrared spectrum through a thermocamera, and a third set of sensors adapted to detect the variations of the composition of the environmental atmosphere by qualitative and quantitative analysis through a chemical-excitation mass spectrometer.

2. The apparatus of claim 1, wherein said telecamera is designed to detect the fumes generated by the condensation of the vapors of the leaked fluid and/or any leak of fluid and/or any alteration of the surfaces of the plants components or the environment due to the condensation or to the reactivity of the fluid.

3. The apparatus of claim 1, wherein said thermocamera detects the thermal image of the vapors of the leaked fluid and/or any leak of fluid and/or any alteration of the surfaces of the plant components or the environment.

4. The apparatus of claim 1, wherein said telecamera and said are located in shielded housing provided with thermostats and can be associated to an automatic training system to have a larger field of observation.

5. The apparatus of claim 1, wherein said telecamera and said thermocamera are associated to a reference sight consisting of an array of halogen lamps shielded by a semitransparent screen and provided with an automatic lighting device as a result of the interruption due to the break of the filament of one or more lamps of the array.

6. The apparatus of claim 1, wherein said mass spectrometer effects analyses of the fluids to be monitored at predetermined intervals, comparing the results with reference data and emitting an alarm signal as a function of said comparison.

7. The apparatus of claim 1 wherein all abnormal events detected by said sensors during automatic control are recorded in graphic form by printer and videorecorder with simultaneous visual and acoustic alarm signals.

8. The apparatus of claim 1, wherein said alarm means generates signals actuated in real or nearly real time and makes the sign a different from one another according to the leakage amount, the leakage location, and the contemporaneousness of any abnormal condition being detected by one or more of said plurality of sensors.

9. The apparatus of claim 2, wherein said thermocamera detects the thermal image of the vapors of the leaked fluid and/or any leak of fluid and/or any alteration of the components or the environment.

10. The apparatus of claim 2, wherein said telecamera and said thermocamera are located in shielded housing provided with thermostats and can be associated to an automatic training system to have a larger field of observation.

11. The apparatus of claim 3, wherein said telecamera and said thermocamera are located in shielded housing provided with thermostats and can be associated to an automatic training system to have a larger field of observation.

12. The apparatus of claim 9, wherein said telecamera and said thermocamera are located in shielded housing provided with thermostats and can be associated to an automatic training system to have a larger field of observation.

13. The apparatus of claim 2, wherein said telecamera and said thermocamera are associated to a reference sight consisting of an array of halogen lamps shielded by a semitransparent screen and provided with an automatic lighting device as a result of the interruption due to the break of the filament of one or more lamps of the array.

14. The apparatus of claim 3, wherein said telecamera and said thermocamera are associated to a reference sight consisting of an array of halogen lamps shielded by a semitransparent screen and provided with an automatic lighting device as a result of the interruption due to the break of the filament of one or more lamps of the array.

15. The apparatus of claim 9, wherein said telecamera and said thermocamera are associated to a reference sight consisting of an array of halogen lamps shielded by a semitransparent screen and provided with an automatic lighting device as a result of the interruption due to the break of the filament of one or more lamps of the array.

16. The apparatus of claim 4, wherein said telecamera and said thermocamera are associated to a reference sight consisting of an array of halogen lamps shielded by a semitransparent screen and provided with an automatic lighting device as a result of the interruption due to the break of the filament of one or more lamps of the array.

17. The apparatus of claim 10, wherein said telecamera and said thermocamera are associated to a reference sight consisting of an array of halogen lamps shielded by a semitransparent screen and provided with an automatic lighting device as a result of the interruption due to the break of the filament of one or more lamps of the array.

18. The apparatus of claim 11, wherein said telecamera and said thermocamera are associated to a reference sight consisting of an array of halogen lamps shielded by a semitransparent screen and provided with an automatic lighting device as a result of the interruption due to the break of the filament of one or more lamps of the array.

19. The apparatus of claim 12, wherein said telecamera and thermocamera are associated to a reference sight consisting of an array of halogen lamps shielded by a semitransparent screen and provided with an automatic lighting device as a result of the interruption due to the break of the filament of one or more lamps of the array.

* * * * *